July 27, 1954  E. M. RODDICK  2,684,491
AUTOMATIC RELEASING TOOLHOLDER
Filed Nov. 24, 1952  2 Sheets-Sheet 1

INVENTOR.
ERIC M. RODDICK,
BY
ATTORNEY.

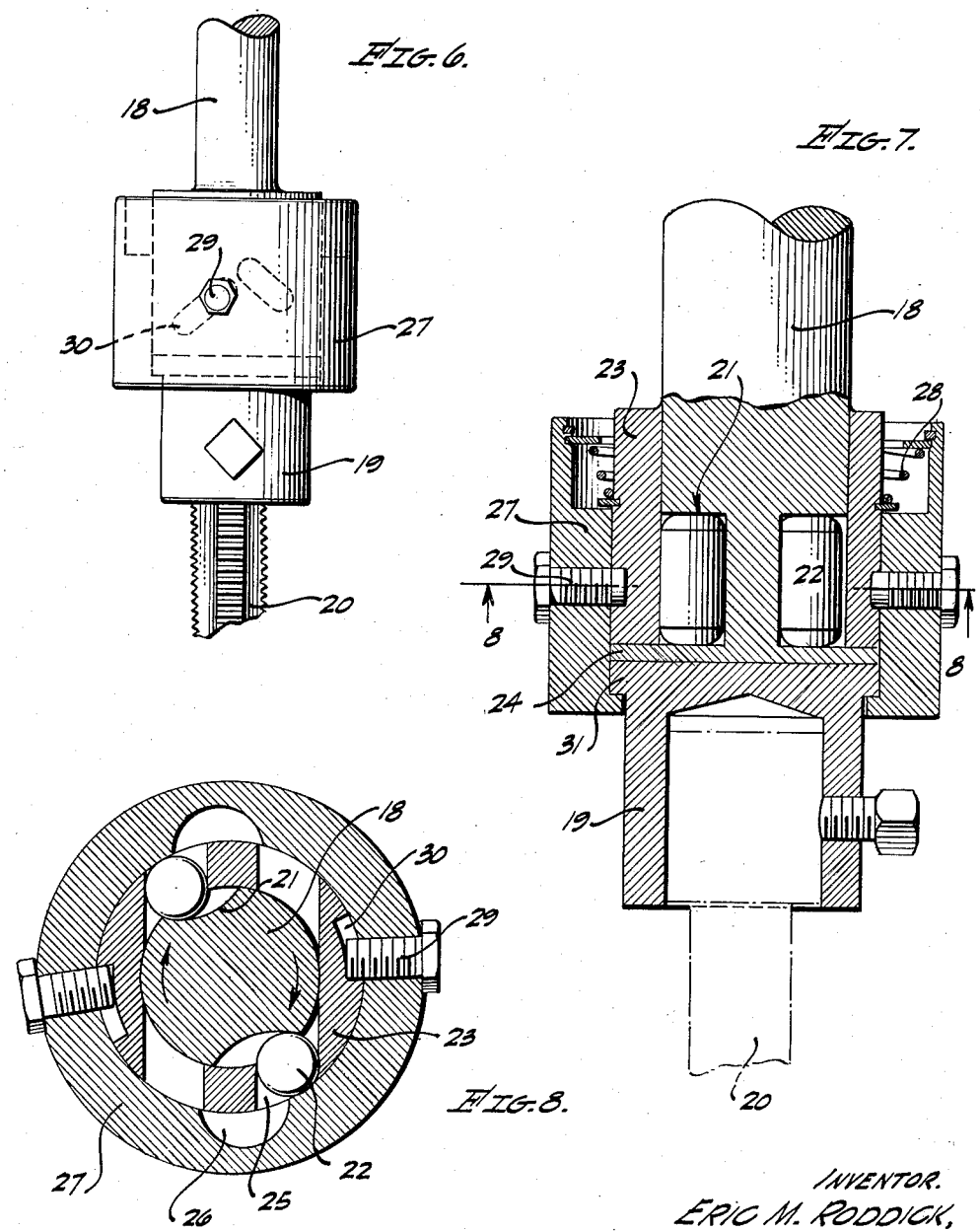

Patented July 27, 1954

2,684,491

UNITED STATES PATENT OFFICE 2,684,491

AUTOMATIC RELEASING TOOLHOLDER

Eric M. Roddick, Anaheim, Calif.

Application November 24, 1952, Serial No. 322,227

3 Claims. (Cl. 10—89)

This invention relates to an automatic releasing tool holder, the tool being such as a tap, die or drill, and includes means whereby the tool is released from the driving shank of the holder when the tool (tap or die) has reached the end of its travel.

An object of my invention is to provide a novel automatic releasing tool holder of the character stated in which the release of the tool from its driving shank is gradual and smooth and not sudden or with a distinct jar or jerk, thus improving the type of work which the tool can do, and also eliminating destructive shocks on the lathe or drill press in which the holder is mounted.

Another object of my invention is to provide a novel tool holder of the character stated in which the shank of the holder and the tool holding spindle are caused to move longitudinally relative to each other when the tool reaches the end of its travel. In this position of the parts, the driving balls or rollers are in a position to be thrust outwardly and release the spindle from driving engagement with the shank.

A feature of my invention resides in the novel arrangement of a cam sleeve which controls the movement of the driving balls inwardly or outwardly, depending on the position of the cam sleeve. This cam sleeve, in turn, is moved longitudinally of the tool by the threading action of the tap or die which is mounted in the spindle of the holder.

Another feature of my invention is to provide a novel tool holder of the character stated which can be used in several types of machines with equal facility, that is, my holder can be used in a machine in which the shank may revolve and the work held stationary, or the shank may be stationary and the work revolved. The machine in the first instance is a drill press, while in the second instance the machine is a turret lathe, or the like.

Other objects, advantages and features of invention may appear from the accompanying drawing, the subjoined detailed description and the appended claims.

In the drawings:

Figure 6 is a side elevation of a modified form of tool holder.

Figure 7 is a side elevation of a modified form of tool holder with parts broken away to show interior construction.

Figure 8 is a sectional view taken on line 8—8 of Figure 7.

Figure 1:
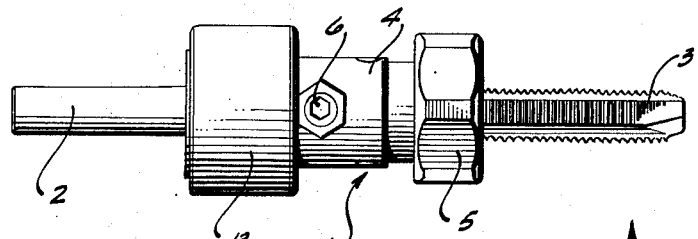
Figure 1 is a side elevation of my automatic releasing tool holder.

Referring more particularly to the drawing, the automatic releasing tool holder 1 consists of a shank 2 which is mounted in the chuck of the lathe, drill press, or the like (not shown). My tool holder is mounted in a machine such as a lathe or a drill press and the stops on the lathe or drill press are so set that the shank 2 will be stopped, as far as longitudinal movement is concerned, a certain distance before the cutting tool 3, such as a tap or die, reaches the bottom of the hole which is being tapped or reamed. This distance is approximately ⅛ of an inch and continued rotation of the shank 2 by the machine will cause the cutter 3 to advance, due to the threading action of the teeth on the tool, thus causing the spindle 4 to move longitudinally with respect to the shank 2, the amount of this movement being shown in Figures 3 and 4.

Figure 2:
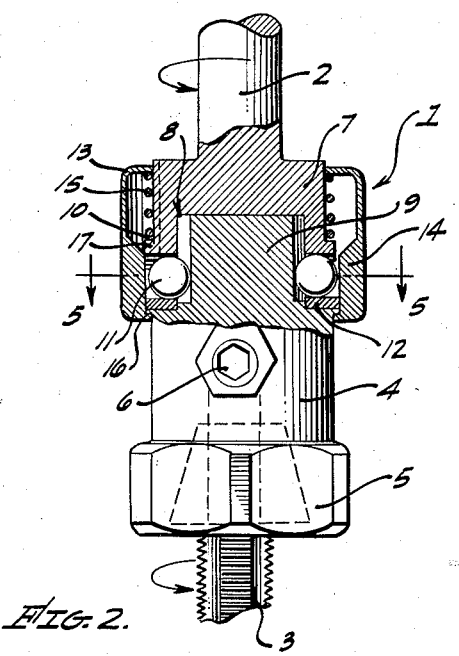
Figure 2 is a side elevation of the same with parts broken away to show interior construction and showing the parts in driving position.

The spindle 4 includes a suitable type of tool holder 5 and these tool holders are usual and well known in the art. A set screw 6 in the spindle 4 also engages the tool 3 and assists in holding this tool in position. The shank 2 is enlarged at its lower end, as shown at 7, and a counterbore 8 in the enlargement 7 receives the upper end 9 of the spindle 4. The end 9 of the spindle is formed with recesses 10 in each of which a ball 11 rests. The enlargement 7 of the shank 2 is formed with laterally extending holes 12 through which the balls 11 can pass. A sleeve 13 surrounds the enlarged portion 7 of the shank 2 and this sleeve is formed with a cam ring 14 on its lower end. A spring 15 engages the sleeve 13 and urges that sleeve upwardly to the position shown in Figure 2, and with the sleeve engaging the shoulder 16 on the spindle 4. The lower end of the spring 15 engages the shoulder 17 on the shank 2 to urge that shank into the position shown in Figure 2, that is, where the lower end of the shank is engaging the spindle 4.

Figure 3:
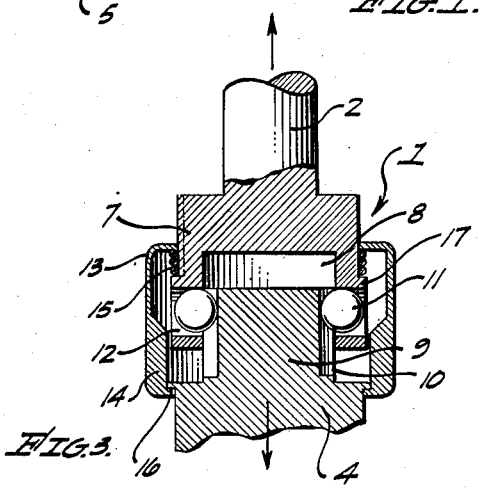
Figure 3 is a fragmentary side elevation of my tool holder with parts broken away and showing the parts in position about to release.
Figure 4:
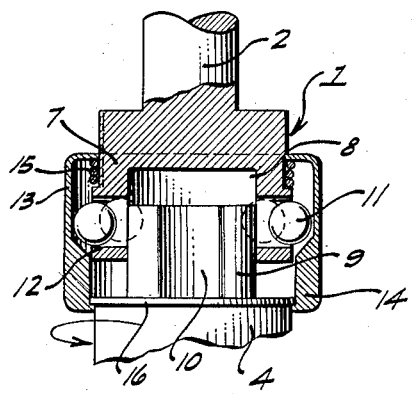
Figure 4 is a view similar to Figure 3 and showing the parts in released position.
Figure 5:
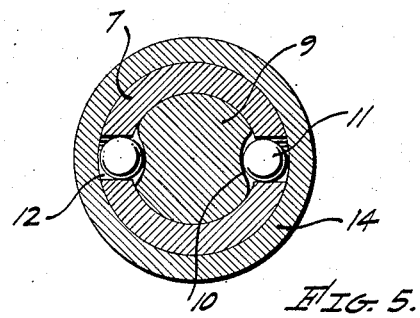
Figure 5 is a sectional view taken on line 5—5 of Figure 2.

In operation this preferred form of my invention functions as follows: The shank 2 is held in the chuck of the machine, such as a lathe or drill press, and is continuously rotated, if the machine is a drill press, or is held stationary, as in the case of a lathe. In either event, the shank 2 can move longitudinally carrying the tool 3 into the work. Before the tool 3 reaches the bottom of the hole which is being tapped or reamed, the shank 2 stops, as far as longitudinal movement is concerned. The continued rotation, however, carries the tool 3 to the bottom of its travel and the threading action of the tool 3 will pull the spindle 4 longitudinally with relation to the shank 2. This is shown in Figures 3 and 4. The cam ring 14 is now moved below the balls 11 and the torque will press the balls 11 outwardly into the holes 12 and partly within the sleeve 13. This releases the upper end 9 of the spindle so that the spindle 4 is not driven and the parts 2 and 4 are disconnected. As soon as the tool 3 has been removed from the work, the spring 15 will return the parts to the position shown in Figure 2 with the balls 11 in driving position connecting the upper end 9 with the enlargement 7 of the shank 2.

In the modified form of my invention, shown in Figures 6, 7 and 8, the shank 18 is mounted in the same manner as the shank 2 previously described. The spindle 19 holds the tool 20 in substantially the same manner as previously described. The shank 18 is provided with recesses 21 which receive rollers 22. A ring 23 encircles the shank 18 and moves with this shank, since it rests on a shoulder 24 of the shank. The ring 23 is provided with slots 25 therein which extend through the ring, permitting the rollers 22 to move outwardly into recesses 26 in an outer sleeve 27. The sleeve 27 is pressed upwardly by a spring 28, the lower end of the spring bearing against the ring 23 to also urge this ring downwardly. A pair of pins 29—29 extend through the sleeve 27 and project into angularly arranged slots 30 in the ring 23. The sleeve 27 is limited in its upward movement under the urging of the spring 28 by engaging the shoulder 31 on the spindle 19.

The operation of the modified form of tool holder is substantially the same as previously described. The tool 20 in the last part of its movement pulls the spindle 19 longitudinally away from the shank 18. This longitudinal movement of the spindle 19 also moves the sleeve 27 causing the pins 29 to move in the angular slots 30, thus imparting a partial rotation to the sleeve 27, thereby aligning the recesses 26 with the rollers 22 and permitting these rollers to move outwardly and disengaging the shank 18, thus eliminating the driving connection between the shank 18 and the spindle 19. The spring 28 will return the parts to the driving position as soon as the tool 20 is removed from the work.

Having described my invention, I claim:

1. An automatic releasing tool holder comprising a shank, a spindle, tool mounting means on said spindle, said shank having an opening in the bottom thereof into which one end of the spindle extends, said spindle having recesses therein each receiving a ball, said shank having holes through the side thereof through which said balls may move, a sleeve surrounding the shank, means mounting said sleeve for limited movement relative to the shank, cam means on the sleeve, said cam means holding the balls within the recesses in the spindle in one position of the sleeve, means mounting the spindle and shank for limited longitudinal movement relative to each other, said cam means being positionable in the extended position of the shank and spindle relative to each other to permit said balls to move outwardly and disengage said recesses in the shank.

2. An automatic releasing tool holder comprising a shank, a spindle, tool mounting means on said spindle, said shank having an opening in the bottom thereof into which one end of the spindle extends, said spindle having recesses therein each receiving a ball, said shank having holes through the side thereof through which said balls may move, a sleeve surrounding the shank, means mounting said sleeve for limited movement relative to the shank, a spring, one end of said spring engaging the sleeve and the other end of said spring engaging the shank, whereby said sleeve and shank are urged to a position engaging the balls with said recesses in the spindle, cam means on the sleeve, said cam means holding the balls within the recesses in the spindle in said one position of the sleeve, means mounting the spindle and shank for limited longitudinal movement relative to each other, said cam means being positionable in the extended position of the shank and spindle relative to each other to permit said balls to move outwardly and disengage said recesses in the shank.

3. An automatic releasing tool holder comprising a shank, a spindle, tool mounting means on said spindle, said shank having an opening in the bottom thereof into which one end of the spindle extends, said spindle having recesses therein each receiving a ball, said shank having holes through the side thereof through which said balls may move, a sleeve surrounding the shank, a shoulder on the spindle engageable by the sleeve and limiting the movement of said sleeve relative to the spindle in one direction, a cam on the inside of the sleeve, said cam engaging the balls and holding said balls within the recesses in the spindle, said spindle and shank being movable longitudinally relative to each other, and spring means extending between the sleeve and the shank and yieldably pressing said sleeve against said shoulder on the spindle.

References Cited in the file of this patent

UNITED STATES PATENTS

| Number | Name | Date |
|---|---|---|
| 447,557 | Clouse | Mar. 3, 1891 |
| 1,124,981 | Weaver | Jan. 12, 1915 |
| 2,184,779 | Kiehne | Dec. 26, 1939 |